United States Patent [19]

Kleinhans

[11] Patent Number: 4,807,470
[45] Date of Patent: Feb. 28, 1989

[54] CIRCUIT ARRANGEMENT WITH A FLOW-MEASURING PROBE OPERATED IN A BRIDGE CIRCUIT

[75] Inventor: Josef Kleinhans, Ludwigsburg, Fed. Rep. of Germany

[73] Assignee: Robert Bosch GmbH, Stuttgart, Fed. Rep. of Germany

[21] Appl. No.: 130,233

[22] PCT Filed: Nov. 3, 1986

[86] PCT No.: PCT/DE86/00440
§ 371 Date: Oct. 7, 1987
§ 102(e) Date: Oct. 7, 1987

[87] PCT Pub. No.: WO87/05694
PCT Pub. Date: Sep. 24, 1987

[30] Foreign Application Priority Data

Mar. 14, 1986 [DE] Fed. Rep. of Germany ....... 3608538

[51] Int. Cl.$^4$ .............................................. G01F 1/68
[52] U.S. Cl. ............................................. 73/204.15
[58] Field of Search ............................................. 73/204

[56] References Cited

U.S. PATENT DOCUMENTS

| | | | |
|---|---|---|---|
| 3,603,147 | 9/1971 | Dorman | 73/204 |
| 3,803,913 | 4/1974 | Tracer | 83/204 |
| 4,043,195 | 8/1977 | Hunting | 73/204 |
| 4,334,186 | 6/1982 | Sasayama et al. | 73/204 X |
| 4,665,745 | 5/1987 | Ina et al. | 73/204 |

Primary Examiner—Herbert Goldstein
Attorney, Agent, or Firm—Kenyon & Kenyon

[57] ABSTRACT

A circuit arrangement with a flow-measuring probe in the form of a hot wire is proposed, the output signal of which is proportional to the operating voltage. For this purpose, the circuit arrangement comprises an oscillator which drives a bistable flipflop which, in turn, opens or closes a switch connecting a bridge circuit and operating voltage under cycle control. The diagonal voltage of the bridge circuit is supplied to the input terminals of a comparator the output connection of which is connected to the reset input of the bistable flipflop. The $\overline{Q}$ output of the bistable flipflop controls a transistor which connects an integrator circuit to the operating voltage when the switch connecting bridge circuit and operating voltage source is closed.

At the output of the integrator circuit, an output signal proportional to the operating voltage is available for further processing.

5 Claims, 1 Drawing Sheet

CIRCUIT ARRANGEMENT WITH A FLOW-MEASURING PROBE OPERATED IN A BRIDGE CIRCUIT

PRIOR ART

A known fuel metering system for an internal combustion engine operates with a flow-measuring probe, which is operated in a bridge circuit, for determining the accurate air volume. The flow-measuring probe is constructed as a hot-wire air volume meter which operates in accordance with the principle of constant temperature. In this arrangement, the hot wire is heated up by a heating current flowing through it, the heating current being adjusted by an electronic regulator to such a level that the operating temperature of the temperature-dependent resistance of the hot wire remains virtually constant. The level of the heating current then supplies reliable and accurate information on the mean time value of the intake air volume. However, the output quantity of such a measuring device has a non-linear relationship to the air volume taken in. In the known circuit arrangement, the output signal supplied by the flow-measuring probe is evaluated by a digital control device. However, this is only possible after a previously performed analog/digital conversion. During this conversion, an accurate voltage reference element is again required as reference source of the absolute voltage. However, this known circuit arrangement, which also largely compensates any dependence of the output signal of the flow-measuring probe on the supply voltage, is very complex and expensive.

ADVANTAGES OF THE INVENTION

The circuit arrangement according to the invention, comprising a flow-measuring probe operated in a bridge circuit and having the features of the main claim, has the advantage that it is designed to be paticularly simple and cost-effective and therefore also appears to be suitable particularly for cases of application which require the air volume to be determined as accurately as possible with the least possible expenditure. The circuit arrangement is distinguished by the fact that the output signal of the flow-measuring probe is proportional to the supply voltage applied. For this reason, a highly accurate voltage reference source can be omitted in the control device evaluating the output signal.

DRAWING

An illustrative embodiment of the invention is shown in the drawing and explained in closer detail in the description following.

DESCRIPTION OF THE ILLUSTRATIVE EMBODIMENT

Figure 1:
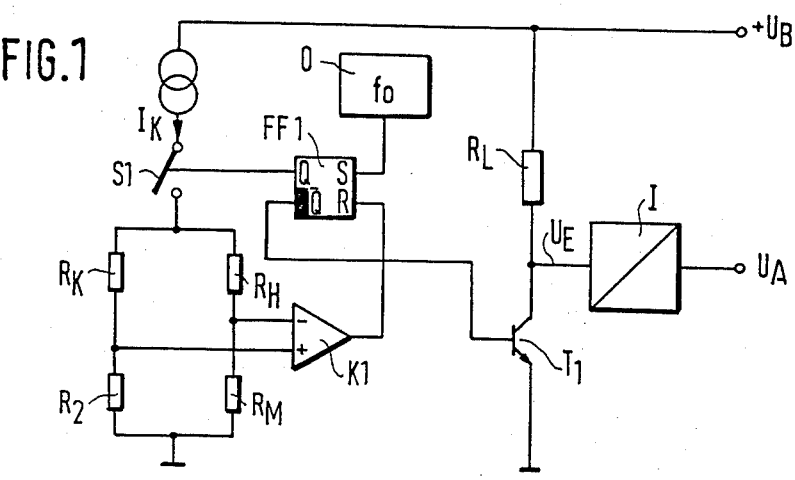
FIG. 1 shows a circuit diagram of the circuit arrangement.

FIG. 1 shows the circuit diagram of the circuit arrangement. A bridge circuit consisting of resistors $R_K$, $R_2$, $R_M$ and $R_H$ is provided through which current $I_K$ of a constant current source flows after closing of a switch S1. In this arrangement, $R_H$ is the resistance of the flow-measuring probe which is constructed as hot wire and which is arranged in the flow cross-section of the intake duct of the internal combustion engine. One bridge diagonal is connected to input connections of a comparator K1 the output connection of which is carried to the R input (reset) of a bistable flipflop FF1. The S input of the bistable flipflop FF1 can be triggered by an oscillator O having the output frequency $f_o$. The Q output of the bistable flipflop FF1 actuates switch S1 which connects the bridge circuit $R_K$, $R_2$, $R_H$, $R_M$ to the constant current source $I_K$ whilst the $\overline{Q}$ output of the bistable flipflop FF1 is connected to the base connection of a transistor $T_1$ the collector connection of which is connected via load resistor $R_L$ to the positive terminal of supply voltage $U_B$. The input connection of the integrator I supplying the output voltage $U_A$ is also connected to the collector connection of transistor $T_1$.

At time t 1, the bistable flipflop FF1 is set by the output signal of oscillator O with frequency $f_o$ and switch S1, which connects the bridge circuit $R_K$, $R_2$, $R_H$, $R_M$ to the constant current source $I_K$, disclosed via the Q output. At the same time, transistor T1 is cut off via the Q output of the bistable flipflop FF1 so that the operating voltage $U_B$ is applied to the input of integrator I. After the closing of switch S1, a constant current $I_K$ flows into the bridge circuit and heats up $R_H$, which has a relatively low cold resistance, until the bridge circuit is balanced. At this time $T_E$, the comparator K1 changes its output state and causes the bistable flipflop FF1 to be reset, with the consequence that, via its $\overline{Q}$ output, transistor $T_1$ is turned on, on the one hand, and, on the other hand, switch S1 is opened again via its Q output.

The output signal $U_A$ of the bridge circuit is a function of the incident air volume in accordance with the following relation:

$$U_A = k \cdot \sqrt{g(\dot{m})} \tag{1}$$

in this formula, k is a constant and g (m) is a nonlinear characteristic function.

With King's formula $$I_H^2 \cdot R_H = g(\dot{m}) \Delta T, \tag{2}$$

in which $I_H$ is the heating current, $R_H$ is the electrical resistance of the flow-measuring probe (hot wire) and $\Delta T$ is the temperature difference between the heated flow-measuring probe and the intake air, the following is obtained for the circuit arrangement according to FIG. 1:

$$T_i \cdot f_o \cdot I_K^2 \cdot R_H = g(\dot{m}) \cdot \Delta T \tag{3}$$

with a sufficiently high frequency $f_o$, $R_H$ and thus $\Delta T$ is approximately constant.

With $$T_o = 1/f_o \tag{4}$$

the following is obtained as duty ratio:

$$\frac{T_i}{T_o} = g(\dot{m}) \cdot \frac{T}{I_K^2 \cdot R_H} = k \cdot g(\dot{m}). \tag{5}$$

thus, the following relation applies for output voltage $U_A$ of integrator I:

$$U_A = \frac{1}{T_o} \int_o^{T_i} U_B \cdot dt = \frac{T_i}{T_o} \cdot U_B \quad (6)$$
$$= k \cdot g(\dot{m}) \cdot U_B$$

This means, therefore, that the output voltage $U_A$ of integrator I is proportional to the operating voltage $U_B$ in the desired manner.

Figure 2:
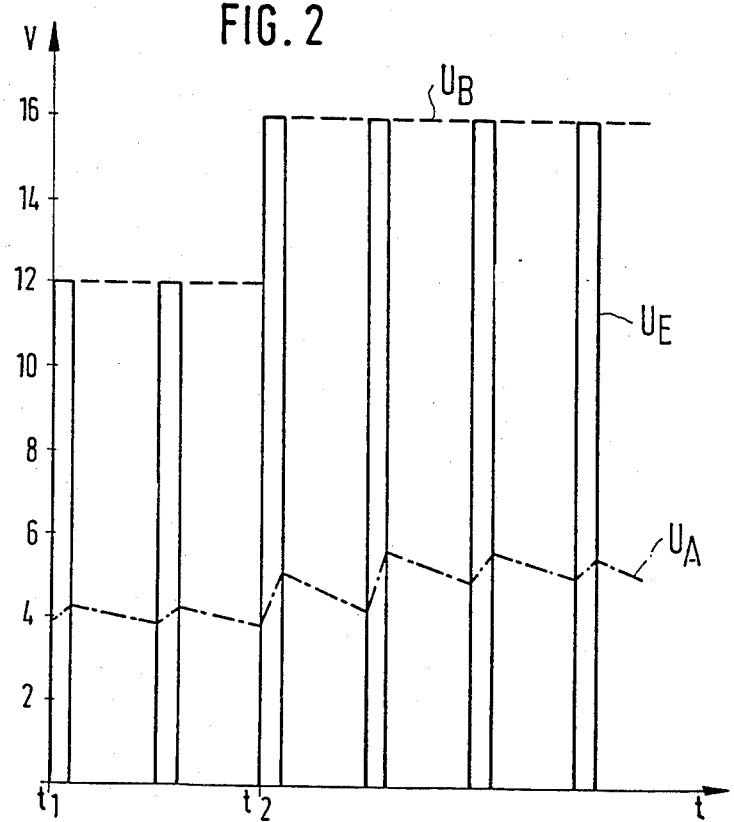
FIG. 2 shows the variation with time of the output voltage of an integrator provided in the circuit arrangement.

The individual voltage variations are shown in dependence on time in FIG. 2. The operating voltage $U_B$, which is initially about 12 V at time t1 but rises to about 16 V at time t2 is drawn as a dashed curve. The continuous curve sections represent the input voltage $U_E$ at the input of integrator I which assumes values of between 0 V and 12 V or 16 V cycle by cycle.

The dot-dashed curve, finally, represents output voltage $U_A$ at integrator I. The output frequency $f_o$ of oscillator O is suitably dimensioned in such a manner that resistance $R_H$ of the flow-measuring probe assumes an essentially constant value in operating condition. The output frequency $f_o$ is suitably between 1 kHz and 10 kHz, preferably between 2 kHz and 8 kHz. In this context, resistance $R_H$ of the flow-measuring probe is approximately between 1.5 and 3.5 ohms.

I claim:

1. A circuit arrangement having a flow-measuring probe operated in a bridge circuit, the circuit arrangement providing an output signal which is a function of the incident air volume through a flow channel in which the flow-measuring probe is disposed and furthermore providing said output signal proportional to an operating supply voltage to the circuit arrangement, comprising a resistive bridge circuit with said flow-measuring probe provided as one element of the bridge circuit, means for determining a balanced state of the bridge circuit comprising means coupled to said bridge circuit for breaking a connection between the bridge circuit and the operating supply voltage when bridge balance has been sensed, and for re-establishing the connection between the bridge circuit and the operating supply voltage after a predetermined imbalance of the bridge circuit has been sensed, and further comprising integrator means coupled to said supply voltage and responsive to the state of balance or imbalance of said bridge circuit, such that said operating supply voltage is supplied to said integrator means when said operating supply voltage is connected to said bridge circuit.

2. The circuit arrangement recited in claim 1, wherein said means for determining bridge balance comprises a comparator means coupled to a bridge diagonal, said comparator means providing an output voltage which is supplied to a reset (R) input of a bistable flipflop, said bistable flipflop having a set (S) input which is triggered by an output signal of an oscillator means, said bistable flipflop having a first output connected to a switching means which alternately connects or disconnects the bridge circuit from the operating supply voltage source, said bistable flipflop further having a second output connected to a base electrode of a transistor which couples said integrator means to the operating supply voltage each time said switching means is closed.

3. The circuit arrangement recited in claim 2, wherein said oscillator means has an output frequency such that the resistance of the flow-measuring probe essentially assumes a constant value.

4. The circuit arrangement recited in claim 3, wherein the output frequency of the oscillator means is between 1 kHz and 10 kHz.

5. The circuit arrangement recited in claim 4, wherein the output frequency of the oscillator means is between 2 kHz and 8 kHz.

* * * * *

UNITED STATES PATENT AND TRADEMARK OFFICE
CERTIFICATE OF CORRECTION

PATENT NO. : 4,807,470

DATED : February 28, 1989

INVENTOR(S) : Josef Kleinhans

It is certified that error appears in the above-identified patent and that said Letters Patent is hereby corrected as shown below:

In Column 2, line 44, change "...$I_H 2$..." to read --...$I^2_H$...-- lines 53, 65, change "$I_K 2$" to read --$I^2_K$--

In Column 3, line 3, change "...$\frac{1}{T_o}$ Ti ..." to read --...$\frac{1}{T_o} \int Ti$...--

In Column 2, line 53, change "...$R_H$..." to read --...$\bar{R}_H$...--

Signed and Sealed this

Ninth Day of January, 1990

Attest:

JEFFREY M. SAMUELS

Attesting Officer     Acting Commissioner of Patents and Trademarks